United States Patent [19]

Schwindt et al.

[11] 3,861,869

[45] Jan. 21, 1975

[54] PRINTING TEXTILES WITH ACRYLIC ACID COPOLYMER PASTE

[76] Inventors: Wolfgang Schwindt, 4 Huttenmellerslrasse; Dieter Wolf, 165 Sternstrasse, both of 6700 Ludwigshafen; Karl Bachs, 33 Knietschstrasse, 6710 Frankenthal; Richard Mueller, 16 Ungsteiner Strasse, 6700 Ludwigshafen, all of Germany

[22] Filed: May 29, 1973

[21] Appl. No.: 364,880

[30] Foreign Application Priority Data
June 2, 1972  Germany .................... 2226937

[52] U.S. Cl. .................. 8/62, 8/92, 260/37 P, 117/161 UD, 260/37
[51] Int. Cl. ............................................ D06p 1/76
[58] Field of Search .................. 8/62; 117/161 UD

[56] References Cited
UNITED STATES PATENTS
3,510,244  5/1970  Schlagenhaufen ................. 8/62

FOREIGN PATENTS OR APPLICATIONS
373,233  5/1932  Great Britain .................... 8/62
1,209,241  10/1970  Great Britain .................... 8/62

OTHER PUBLICATIONS

An Introduction to Textile Printing, 1964, pages 5–7, pub. by Butterworths, London Eng.

*Primary Examiner*—Donald Levy
*Attorney, Agent, or Firm*—Johnston, Keil, Thompson & Shurtleff.

[57] ABSTRACT

A textile printing process without intermediate drying with the addition of a thickener of specific composition so that bleeding during fixing on the moist material is prevented.

4 Claims, No Drawings

PRINTING TEXTILES WITH ACRYLIC ACID COPOLYMER PASTE

The invention relates to a textile printing process in which intermediate drying prior to fixing is dispensed with.

It is usual to print textiles with print pastes which contain dye, thickener and other auxiliaries. The printed textile is then heated to fix the dye. The print is as a rule dried before the dye is fixed. The intermediate drying is carried out in a separate and often time-consuming operation in expensive and voluminous units, usually at temperatures of about 60° to 100°C at which there is negligible bleeding. In the course of rationalization of textile printing it has proved to be desirable, particularly in the printing of voluminous textiles, for example carpets, to dispense with the drying process prior to fixing. There is then the problem, particularly in the case of voluminous goods, and above all when using dyes which are soluble in water, that during fixing the moist print becomes blurred because of bleeding.

It has not been possible hitherto to prevent bleeding. The present invention has for its object to provide a remedy for this.

This object has now been found to be achieved by a process for the production of a printed polyester or polyamide textile by printing with a print paste which contains a synthetic thickener and at least one dye selected from the group consisting of acid, complex metal and disperse dyes and fixing the dye on the fiber, in which the printed material is not dried prior to fixing and the print paste has added to it as thickener from 0.25 to 5% by weight, based on the print paste, of a mixture of the following components:

a. from 0.5 to 50% by weight, based on the mixture of components (a), (b) and (c), of a copolymer of (1) from 95 to 99.95% by weight, based on the copolymer, of acrylic acid and/or methacrylic acid; and (2) from 5 to 0.05% by weight of a copolymerizable monomer having two double bonds;

b. from 10 to 80% by weight, based on the mixture of components (a), (b) and (c), of an organic liquid which boils at above 130°C and does not dissolve the copolymer and which prior to mixing with components (a) and (c) contains less than 2% by weight of water, based on the liquid, and c. from 0.5 to 50% by weight, based on the mixture of components (a), (b) and (c), of a nonionic or anionic emulsifier.

The terms acid dye and disperse dye are intended to include the dyes appearing in the Colour Index under these terms. Complex metal dyes are dyes which contain the metal in complex combination, i.e., not as in a salt. They usually belong to the acid dyes. The term "dye" does not include pigments.

Particularly suitable copolymerizable monomers (a) (2) are unsaponifiable divinyl compounds of six to fourteen, preferably of six to ten, carbon atoms such as divinylethane, divinylnaphthalene, divinylpyrrole, divinylbenzene or divinyldioxane. Hydrolyzable divinyl compounds such as butanediol diacrylate or other esters of copolymerizable olefinically unsaturated monocarboxylic acids of three to five carbon atoms with aliphatic glycols of two to eight, preferably of two to four, carbon atoms or divinyl or diallyl esters of aliphatic or aromatic dicarboxylic acids of two to eight carbon atoms such as diallyl phthalate may however also be used.

After the components (a), (b) and (c) have been mixed and conveniently not until making the print paste the carboxyl groups of the copolymer (a) are neutralized. This is effected by adding an aqueous solution of a base, preferably ammonia, in at least an equimolar amount, i.e. from 1 to about 1.5 moles of base is added for each mole of carboxyl groups.

The organic liquid having a boiling point above 130°C (b) which is added to the mixture in an amount of from 10 to 80%, preferably from 20 to 70%, by weight to the mixture has the function of a carrier for the copolymer (a) in which the copolymer is finely distributed. Immediately before the liquid is mixed with the two components (a) and (c) it should contain less than 2% and preferably less than 1% by weight of water. This is necessary because otherwise the finely powdered copolymer (a) agglomerates when mixed with the liquid and is not finely dispersed therein. The copolymer (a) in turn should naturally also be as dry as possible but in practice a certain water content of the order of from 1 to 2% by weight can hardly be avoided and is not troublesome if the liquid (and also the emulsifier (c)) is substantially anhydrous.

The chemical nature of the liquid does not play any appreciable role provided that in the print paste it is inert, particularly with respect to the copolymer (a), which means above all that it should neither dissolve the copolymer nor cause it to coagulate. The liquid should be easily washed out and/or be odorless or at least have no disagreeable odor. Oily consistency of the liquid is desirable.

Examples of suitable liquids are aliphatic, cycloaliphatic and aromatic hydrocarbons and the corresponding alcohols, ketones or ethers, organosilicon compounds and particularly liquid esters of aromatic or aliphatic, branched or linear, saturated or unsaturated carboxylic acids of ten to twenty carbon atoms and the corresponding alcohols of eight to thirty carbon atoms, polyfunctional alcohols such as glycerol, and also animal or vegetable oils, and polyfunctional acids such as dibutyl phthalate. Substantially odorless oily liquids which are not easily washed out and which in the finished print exert a softening effect are preferred. Examples of these are the said esters and also tetraalkyl silicates of from four to thirty carbon atoms in the alkyl moiety, and liquid polymethoxysiloxanes.

Examples of suitable nonionic emulsifiers (c) which are used in an amount of from 0.5 to 50% and preferably from 5 to 30% by weight based on the mixture of components (a), (b) and (c) are fatty acids of more than twelve carbon atoms oxyalkylated with from eight to thirty moles of ethylene oxide or propylene oxide; also oxyalkylated phenols which may be nuclear arylated, alkylated or otherwise substituted or may be unsubstituted; also oxyalkylated amides of at least twelve carbon atoms and oxyalkylated alcohols of the same number of carbon atoms; polyethylene oxides, polypropylene oxides or copolyadducts of the two in each case of a degree of polymerization of from 8 to 30. Examples of anionic emulsifiers which are used in the same amount as the nonionic emulsifiers are soaps and salts of alkylsulfonic, arylsulfonic and alkylarylsulfonic acids. As already mentioned they should be as dry as possible.

There is no difficulty in mixing the three components. A very convenient method is to place a solution or emulsion of the emulsifier (c) in the liquid (b) in a vessel and add the powdered copolymer (a) while stirring. Conventional stirring with a blade stirrer is usually adequate.

Print pastes are pasty formulations of dyes, thickeners and solvents or dispersing phases, mainly water, with or without auxiliaries, for example dispersing agents, catalysts, softeners, leveling agents and the like suitable for textile printing.

The advantage of the process of the invention is particularly important in the case of dyes which are soluble in water because without intermediate drying these have a particularly strong tendency to bleed during fixing.

A textile printer understands by fixing a thermal treatment of the printed material to produce a durable combination of the dye with the substrate. As a rule the printed material is heated at about 100° to 220°C with hot air or steam.

Thickeners are high polymers which impart a high viscosity to the print paste by adding a fairly small amount, usually from 0.5 to 5% and preferably from 1 to 3% by weight based on the print paste. Their function is to prevent bleeding of the print beyond the edges produced. As already stated this is only possible (except in the case of pigment printing on textiles of low bulk volume) when an intermediate drying is carried out prior to fixing.

The thickening to be used according to the invention preferably consists entirely of the mixture of components (a), (b) and (c). Other conventional thickeners may however be used as well in an amount of up to 50% by weight based on the whole of the thickener. Examples of these other thickeners are various types of starch and their degradation and conversion products, for example dextrin and British gum and also gum arabic, alginates, tragacanth and the like.

It could not in any way have been foreseen that the use according to the invention of the mixture of (a), (b) and (c) as a thickener would prevent bleeding during fixing of prints which have not been intermediately dried so that the drying process is superfluous.

The following Examples illustrate the invention. The parts in the Examples are parts by weight and the percentages are percentages by weight.

EXAMPLE 1

A print paste is prepared from: 3 parts of the blue dye of the formula (I):

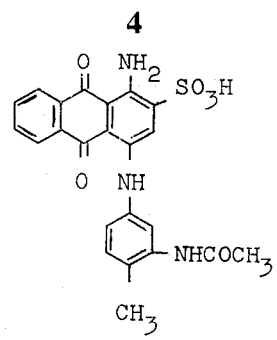

10 parts of a pasty dispersion of
 20% of a copolymer of 99.9 parts of polyammonium acrylate and 0.1 part of butanediol diacrylate;
 78% of castor oil; and
 2% of the sodium salt of the monosulfuric ester of a $C_{12-16}$ alcohol oxyethylated 15 times;
20 parts of butyl diglycol;
30 parts of urea;
5 parts of aqueous 25% ammonia solution; and 932 parts of water.

A polyamide tufted carpet material is printed with this print paste on a rotary screen printing machine and then, without intermediate drying, fixed for 4 minutes with saturated steam, rinsed and dried.

The outlines of the print are very satisfactory.

EXAMPLE 2

A print paste is prepared from: 10 parts of the brown 1:2-cobalt complex of an equimolar mixture of the dyes of formulae (II) and (III)

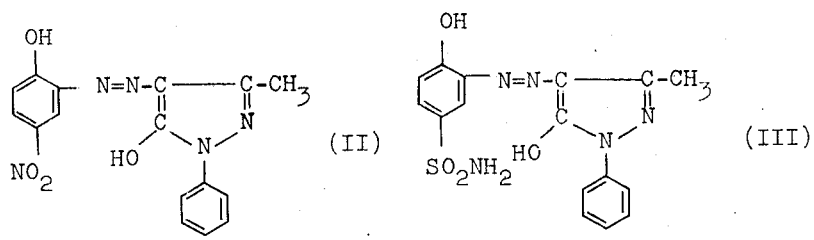

15 parts of a pasty dispersion of
 25% of a copolymer from 99.9 parts of polyammonium acrylate and 0.1 part of divinylbenzene;
 74% of the tetra $C_{16-18}$ alkyl ester of silicic acid; and
 1% of octylphenol oxyethylated twenty times;
30 parts of thiodiglycol
30 parts of urea
30 parts of benzyl alcohol
5 parts of 25% ammonia solution and
880 parts of water.

A polyamide needleloom material is printed on a rotary screen printing machine with this print paste and then without intermediate drying it is fixed with saturated steam, rinsed and tried.

The print has sharp outlines.

EXAMPLE 3

A print paste is prepared from: 10 parts of the yellow 1:2-chromium complex of the dye of formula (IV):

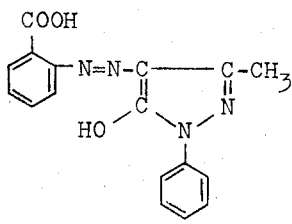

(IV)

20 parts of a pasty dispersion of
  20% of a copolymer of 99.8 parts of polyammonium acrylate and 0.2 part of divinyldioxane;
  76% of castor oil; and
  4% of isononylphenol oxyethylated twenty times;
30 parts of thiodiglycol;
5 parts of 25% ammonia solution; and
935 parts of water.

A voluminous polyamide velour material is printed with this print paste on a flat screen printing machine and the print is fixed without intermediate drying with saturated steam for six minutes, rinsed and dried.

A faultless sharp print is obtained.

EXAMPLE 4

A print paste is prepared from: 10 parts of the dye of formula (V):

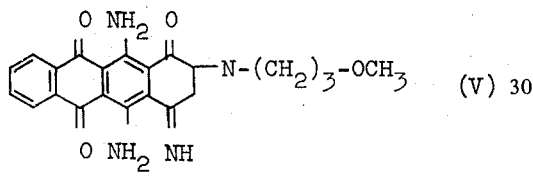

(V)

15 parts of a pasty dispersion of
  25% of a copolymer of
  99.9 parts of polyammonium acrylate and
  0.1 part of butanediol diacrylate;
  73% of isodecyl stearate; and
  2% of p-phenylphenol oxyethylated ten times;
50 parts of o-phenylphenol;
5 parts of ammonia solution (25%); and
920 parts of water.

A polyester carpet material is printed with this print paste on a rotary screen printing machine and without intermediate drying is then fixed for ten minutes with saturated steam, rinsed and dried.

Carpet material showing sharp outlines of the print is obtained.

We claim:

1. A process for the production of a printed polyester or polyamide textile which process consists essentially of:

A. applying to said textile a print paste containing a synthetic thickener and at least one dye selected from the group consisting of acid dyes, metal complex dyes and disperse dyes, the amount of said thickener being from 0.25 to 5% by weight based on the print base, said thickener consisting essentially of a mixture of the following components:

a. from 0.5 to 50% by weight (based on the mixture of (a), (b) and (c)) of a copolymer of -
  1. from 95 to 99.95% by weight, based on the copolymer, of acrylic acid and/or methacrylic acid; and
  2. from 5 to 0.05% by weight of a copolymerizable monomer having two isolated double bonds and from six to fourteen carbon atoms, b. from 10 to 80% by weight, based on the mixture of (a), (b) and (c), of an organic liquid which does not dissolve the copolymer (a), which boils at above 130°C and which prior to being mixed with components (a) and (c) contains less than 2% by weight of water, based on the liquid; and c. from 0.5 to 50% by weight, based on the mixture of (a), (b) and (c), of a nonionic or anionic emulsifier, the carboxyl groups of the copolymer (a) having been neutralized before or during the preparation of the print paste, and B. thereafter heating said printed material to fix and dye without intermediate drying of the print paste.

2. A process as set forth in claim 1, wherein the dye is fixed by heating the textile at about 100° to 220° C with hot air or steam.

3. A process as set forth in claim 1, wherein the amount of thickener is from 1 to 3% by weight based on the print paste.

4. A process as set forth in claim 1, wherein the amount of (b) is from 20 to 70% by weight based on the weight of the mixture of (a), (b) and (c) and the amount of (c) is from 5 to 30% by weight based on the mixture of (a), (b) and (c).

* * * * *